United States Patent [19]

Mikeska et al.

[11] Patent Number: 5,046,990
[45] Date of Patent: Sep. 10, 1991

[54] FIXED GUARD FOR ROTATING JOINTS

[75] Inventors: Felix Mikeska, Siegburg; Hans-Jürgen Langen, Frechen, both of Fed. Rep. of Germany

[73] Assignee: Jean Walterscheid GmbH, Lohmar, Fed. Rep. of Germany

[21] Appl. No.: 571,776

[22] Filed: Aug. 22, 1990

[30] Foreign Application Priority Data

Aug. 22, 1989 [DE] Fed. Rep. of Germany ....... 3927588

[51] Int. Cl.$^5$ ............................................. F16C 1/26
[52] U.S. Cl. ...................................... 464/175; 403/23; 403/51
[58] Field of Search ............................ 403/23, 50, 51; 464/175, 173

[56] References Cited

U.S. PATENT DOCUMENTS

| 4,107,952 | 8/1978 | Geisthoff | 464/175 |
| 4,325,587 | 4/1982 | Seigert | 464/175 X |
| 4,411,636 | 10/1983 | Buthe et al. | 464/175 X |
| 4,496,334 | 1/1985 | Mikeska | 464/175 |
| 4,605,332 | 8/1986 | Mayhew et al. | 403/23 |
| 4,747,804 | 5/1988 | Benzi | 403/23 X |

FOREIGN PATENT DOCUMENTS 3033850 3/1982 Fed. Rep. of Germany .

Primary Examiner—Andrew V. Kundrat
Attorney, Agent, or Firm—Toren, McGeady & Associates

[57] ABSTRACT

A device for protecting a wide angle joint (8) associated with a driveshaft (7) for driving agricultural implements. It consists of a guard (1, 6, 11) which at least partially covers the double joint (8) and which is arranged so as to be axially movable relative to a sliding ring (2). The sliding ring (2) holds the guard (1) at a certain distance from the joint (8). The conical guard at its radially inward end comprises a flexible convoluted tube (6) covering the joint (8). The sliding ring (2) can contact a contact edge (10) of the tube (6) to compress it asymmetrically.

4 Claims, 3 Drawing Sheets

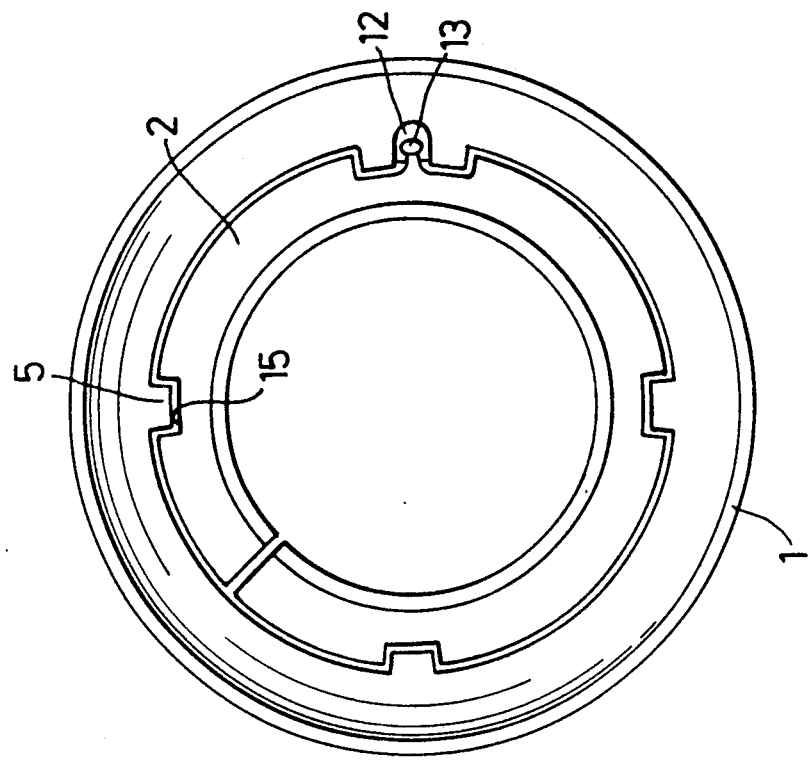
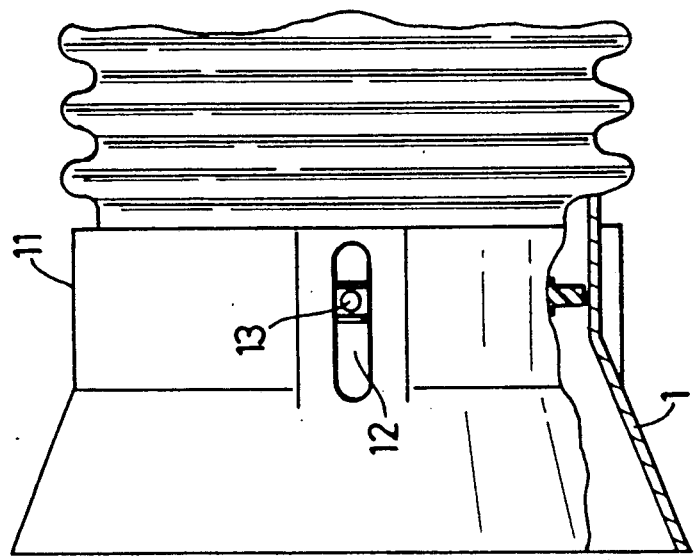

5,046,990

FIXED GUARD FOR ROTATING JOINTS

BACKGROUND OF THE INVENTION

1. Field of the Invention

This invention is concerned with a device for protecting a wide angle joint associated with a driveshaft for driving agricultural implements or the like, the device comprising a hollow guard at least partially covering the joint. The guard may be at least partially conical.

2. Description of Prior Art

Such hollow guards are known from West German Patent Specification No. 35 09 128 and its British equivalent No. 2173881, for example, and serve to protect rotating joints or driveshafts of power take-off shafts. The joint angles may be very large so that there may occur frictional wear between the hollow guard and joint. In the case of the aforementioned prior art design, the hollow guard is held at a distance from the joint by a bearing ring, with the bearing ring being capable of being compressed by a certain amount and thus being able to conform to the articulation movements. However, these compressional movements have been found to be insufficient.

SUMMARY OF THE INVENTION

It is the object of the present invention to provide a hollow guard of the aforementioned type which permits large joint angles and which avoids the joint contacting the interior of the hollow guard.

The invention provides a device for protecting a wide angle joint associated with a driveshaft for driving agricultural implements or the like, the device comprising a hollow guard at least partially covering the joint, wherein the device also comprises a sliding ring mounted on the joint, the ring being axially movable in the guard, the hollow guard clears the joint by a distance determined by the sliding ring, and the hollow guard, at an axial inward end thereof, comprises a flexible convoluted tube covering the joint and joining the remainder of the guard at an edge which is contactable by the ring.

In this way, it is possible to provide a fixed single-part hollow guard in which a driveshaft or the joint of a driveshaft may be articulated by any angle required. The device comprises a flexible region which can be bent if necessary. The sliding ring holds the hollow guard at a distance from the joint and, if required, bends the flexible part.

To ensure safe and interference-free guidance, the outer circumference of the sliding ring may be provided with guiding grooves engaged by radially inwardly pointing and axially extending pulling ribs in a cylindrical part of the hollow guard, with the ribs movably guiding the sliding ring.

Furthermore, it is proposed that the flexible convoluted tube should be deformed asymmetrically when the sliding ring contacts the contact edge.

For lubricating the sliding ring, it may be provided with a radially outwardly pointing lubricating nipple, the lubricating nipple projecting through an axially extending aperture in a cylindrical part of the guard.

BRIEF DESCRIPTION OF THE DRAWINGS

An illustrative embodiment of a device according to the invention is illustrated in the attached drawings and is described in more detail below.

FIG. 3 shows a cylindrical part of a hollow guard of the device shown in FIGS. 1 and 2 with guiding slot as well as a lubricating nipple of a sliding ring guided in a guiding slot; and FIG. 4 is front view of the hollow guard of the device shown in FIGS. 1 and 2.

DESCRIPTION OF PREFERRED EMBODIMENTS

Figure 1:
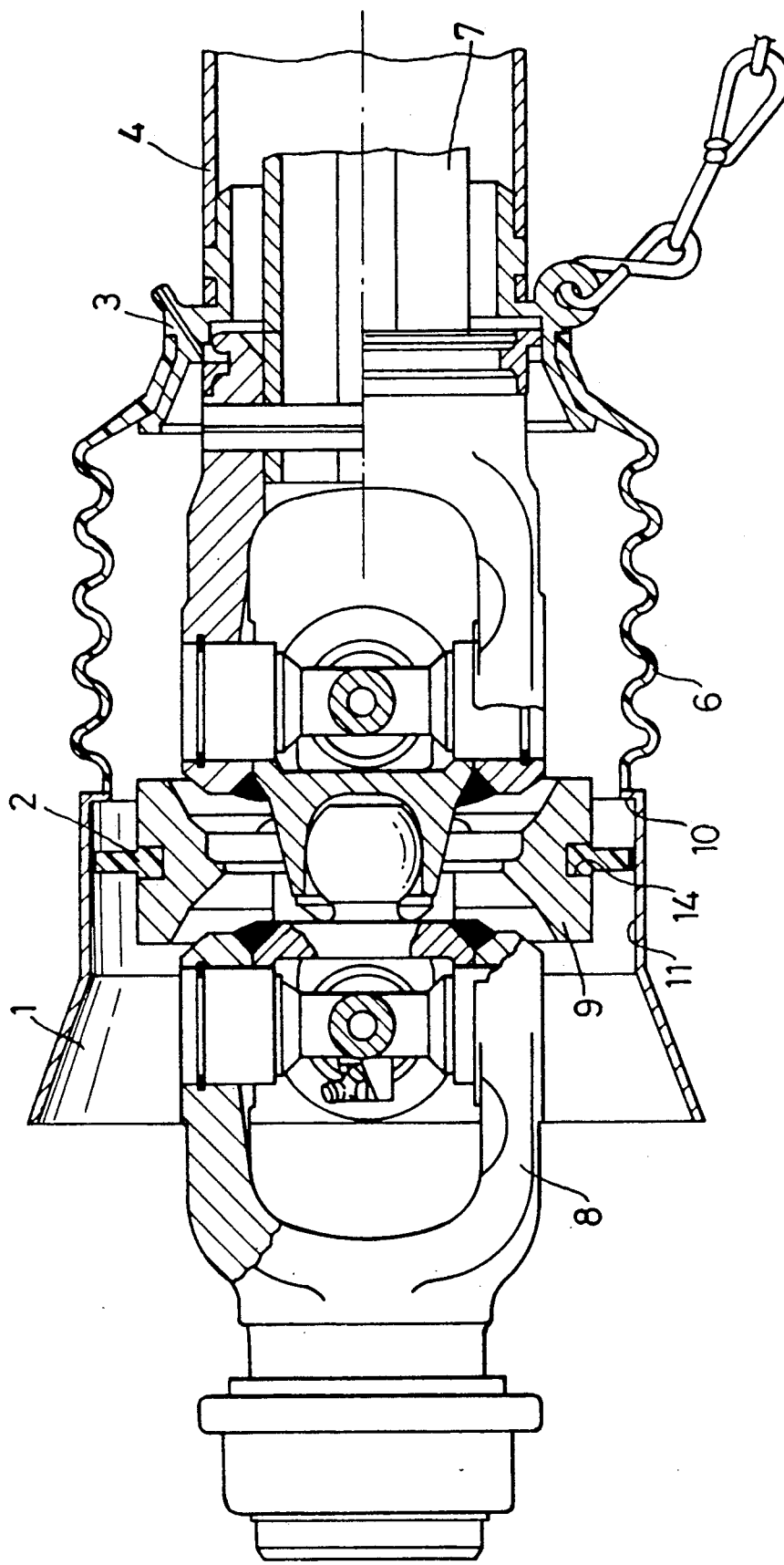
FIG. 1 is a longitudinal section through a joint including a device according to the invention.

As illustrated in FIG. 1, a driveshaft 7 for driving agricultural implements or the like is covered by a protective tube 4 which is provided with a protective cap 3. The driveshaft 7 is associated with a wide angle joint 8 which is protected by a protective device according to the invention. The device comprises a hollow gaurd which comprises a flexible convoluted tube 6 which is plugged on to, preferably slid on to and held on, the protective cap 3. The flexible convoluted tube 6 joins at its axially outward end on to the remainder of the hollow guard of the device which has a cylindrical portion 11 and an axially outward conical portion 1. The cylindrical portion 11 surrounds the central part of the double joint 8. A sliding ring 2 of the device is mounted for rotation in a recess 14 of a central yoke 9 of the joint 8 and, as can be seen in FIG. 4, is held and guided by axially extending pulling ribs 5 of the cylindrical part 11 which extend into guiding grooves 15 in the ring 2. The guard 1, 6, 11 clears the joint 8 by a distance determined by the ring 2.

Figure 2:
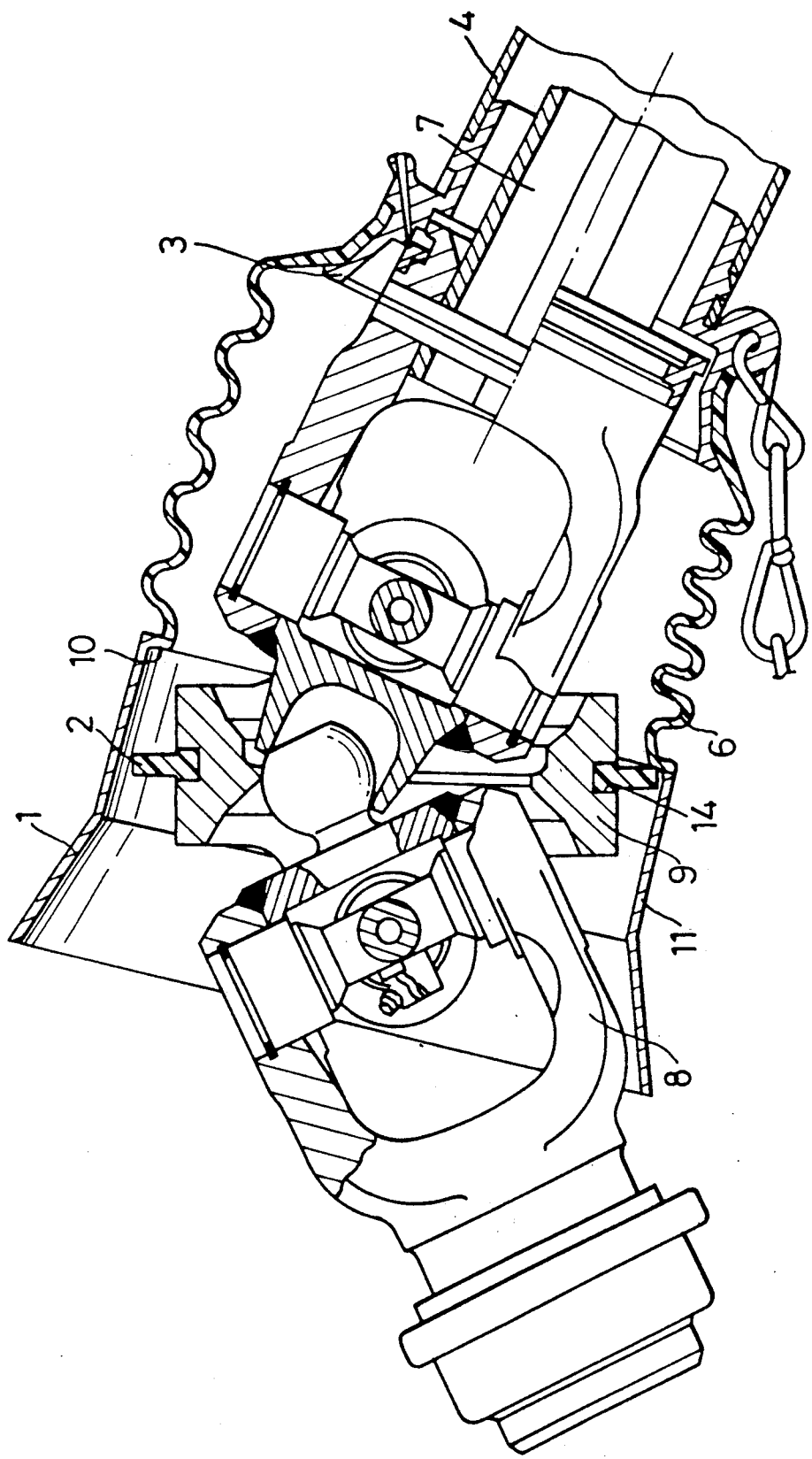
FIG. 2 shows the joint according to FIG. 1 in an articulated condition, with a flexible convoluted tube of the device asymmetrically deformed.

If the joint 8 is articulated at extreme angles, the sliding ring 2, comes to rest between the cylindrical part 11 and the flexible convoluted tube 6, as shown in FIG. 2. The ring 2 contacts a contact edge 10 of the tube 6, adjacent the part 11 and extending radially inwardly relative to the cylindrical part 11. The sliding ring 2, thus, rests against the flexible convoluted tube 6 and axially compresses it in this region. On the opposite side, the convoluted tube 6 is extended.

The sliding ring 2 holds the portions 1 and 11 of the guard in an approximately constant position relative to the outer circumference of the joint 8 and prevents the joint 8 from running against the interior of the guard.

As can be seen in FIG. 3, a lubricating nipple 13 extends through an aperture 12 in the cylindrical part 11 of the guard for the purpose of lubricating the sliding ring 2.

As shown in FIG. 4, the inside of the guard portion 11 is provided with pulling ribs 5 in which the sliding ring 2 is axially movable.

We claim:

1. A device for protecting a wide angle joint associated with a driveshaft for driving agricultural implements or the like, the device comprising:
   a smooth and hollow protective guard at least partially covering the joint;
   a sliding ring mounted on the joint inside said hollow guard so that the hollow gaurd clears the joint by a distance relative to a diameter of the sliding ring, the hollow guard having an axial inward end formed with a flexible convoluted tube, the hollow guard having a cylindrical inside surface by means of which the hollow guard is displaceably supported upon the sliding ring, and the hollow guard further having an inwardly oriented contact edge at a transition to the convoluted tube, which edge is formed so as to be contactable by the sliding ring.

2. A device according to claim 1, wherein the sliding ring has an outer circumference provided with guide grooves engaged by radially inwardly pointing and axially extending pulling ribs in the cylindrical inside surface of the hollow guard and which guide the hollow guard in a displaceable manner.

3. A device according to claim 1, wherein the flexible convoluted tube is asymmetrically deformable when the sliding ring contacts the contact edge.

4. A device according to claim 1, wherein the sliding ring is provided with a radially outwardly pointing lubricating nipple, the lubricating nipple projecting through an axially extending aperture in a cylindrical part of the guard.

* * * * *